United States Patent
Lim (10) Patent No.: US 10,919,362 B2
(45) Date of Patent: Feb. 16, 2021

(54) COOLANT HEATER

(71) Applicant: Hanon Systems, Daejeon (KR)

(72) Inventor: Cha You Lim, Daejeon (KR)

(73) Assignee: Hanon Systems, Daejeon (KR)

( * ) Notice: Subject to any disclaimer, the term of this patent is extended or adjusted under 35 U.S.C. 154(b) by 637 days.

(21) Appl. No.: 15/889,824

(22) Filed: Feb. 6, 2018

(65) Prior Publication Data

US 2018/0222279 A1   Aug. 9, 2018

(30) Foreign Application Priority Data

Feb. 7, 2017  (KR) .................. 10-2017-0016986

(51) Int. Cl.
| | | |
|---|---|---|
| *B60H 1/00* | (2006.01) | |
| *B60H 1/22* | (2006.01) | |
| *F24H 1/12* | (2006.01) | |
| *F24H 1/00* | (2006.01) | |

(52) U.S. Cl.
CPC ....... *B60H 1/00392* (2013.01); *B60H 1/2215* (2013.01); *B60H 1/2218* (2013.01); *B60H 1/2221* (2013.01); *F24H 1/0018* (2013.01); *F24H 1/121* (2013.01); *B60H 2001/2271* (2013.01); *B60H 2001/2278* (2013.01)

(58) Field of Classification Search
None
See application file for complete search history.

(56) References Cited

U.S. PATENT DOCUMENTS

| | | | | |
|---|---|---|---|---|
| 2,266,216 | A * | 12/1941 | Kimberlin | F02N 19/10 392/489 |
| 2,640,138 | A * | 5/1953 | Merritt | F02N 19/10 392/489 |
| 3,218,433 | A * | 11/1965 | Steenbergen | F02N 19/10 219/208 |
| 3,626,148 | A * | 12/1971 | Woytowich | F02N 19/10 219/208 |
| 3,969,605 | A * | 7/1976 | Danell | F02N 19/10 219/208 |
| 4,249,491 | A * | 2/1981 | Stein | F02N 19/10 123/142.5 E |
| 4,308,994 | A * | 1/1982 | Perhats | B60H 1/08 237/12.3 B |
| 4,762,980 | A * | 8/1988 | Insley | F24H 1/103 338/305 |
| 5,408,960 | A * | 4/1995 | Woytowich | B60L 1/02 123/142.5 E |
| 5,701,388 | A * | 12/1997 | Steinhardt | A61H 33/0095 392/471 |
| 5,855,319 | A * | 1/1999 | Burner | F24H 9/148 237/12.3 B |
| 6,724,983 | B1 * | 4/2004 | Humburg | B60H 1/22 165/41 |

(Continued)

FOREIGN PATENT DOCUMENTS

KR   10-2011-0075118 A   7/2011

*Primary Examiner* — Thor S Campbell
(74) *Attorney, Agent, or Firm* — Norton Rose Fulbright US LLP; James R. Crawford (57) ABSTRACT

Provided is a coolant heater, and more particularly, is a coolant heater capable of minimizing a mounting space and weight by integrating the coolant heater and a water pump with each other and improving a cooling effect of the coolant heater and a controller for controlling a coolant transporter.

13 Claims, 6 Drawing Sheets

(56) References Cited

U.S. PATENT DOCUMENTS

| | | | | |
|---|---|---|---|---|
| 7,270,098 | B2* | 9/2007 | Young | B60H 1/2206 |
| | | | | 123/142.5 R |
| 7,657,961 | B2* | 2/2010 | Shank | F24H 1/105 |
| | | | | 15/250.02 |
| 8,989,566 | B2* | 3/2015 | Liu | F04D 13/06 |
| | | | | 392/471 |
| 9,127,762 | B2* | 9/2015 | Oh | F16H 57/0417 |
| 9,410,718 | B2* | 8/2016 | Carlens | F24H 1/121 |
| 9,631,836 | B2* | 4/2017 | Pierron | B60H 1/2221 |
| 10,065,480 | B2* | 9/2018 | Pierron | F24H 9/0015 |
| 10,174,737 | B2* | 1/2019 | Oen | H05B 3/24 |
| 10,499,764 | B2* | 12/2019 | Teylor | A47J 31/461 |
| 2001/0043808 | A1* | 11/2001 | Matsunaga | B60H 1/2221 |
| | | | | 392/494 |
| 2009/0107974 | A1* | 4/2009 | Testa | B60H 1/034 |
| | | | | 219/208 |
| 2011/0255960 | A1* | 10/2011 | Seitz | F04D 29/061 |
| | | | | 415/203 |
| 2014/0205881 | A1* | 7/2014 | Elsaesser | H01M 10/6568 |
| | | | | 429/120 |
| 2018/0319252 | A1* | 11/2018 | Kohl | F24H 1/009 |
| 2020/0259228 | A1* | 8/2020 | Eser | H01M 10/63 |

\* cited by examiner

COOLANT HEATER

CROSS-REFERENCE TO RELATED APPLICATIONS

This application claims priority under 35 U.S.C. § 119 to Korean Patent Application No. 10-2017-0016986, filed on Feb. 7, 2017, in the Korean Intellectual Property Office, the disclosure of which is incorporated herein by reference in its entirety.

TECHNICAL FIELD

The following disclosure relates to a coolant heater. More particularly, the following disclosure relates to a coolant heater capable of minimizing a mounting space and weight by integrating the coolant heater and a water pump with each other and improving a cooling effect of the coolant heater and a controller for controlling a coolant transporter.

BACKGROUND

A vehicle having an engine using an energy source such as gasoline or diesel as a driving source is currently the most common type of vehicle, but since such an energy source for vehicle has various problems such as environmental pollution problem as well as reduction of an amount of oil deposits, the need for new energy sources is gradually increased. Accordingly, electric vehicles, hybrid cars, and fuel cell vehicles are being currently practically used or being developed.

However, unlike the conventional vehicle having the engine using oil as the energy source, a heating system using a coolant may not be applied to the electric vehicles, the hybrid cars, and the fuel cell vehicles or it is difficult to apply the heating system to the electric vehicles, the hybrid cars, and the fuel cell vehicles. That is, the conventional vehicle having the engine using oil as the energy source as the driving source generates a very large amount of heat in the engine, includes a coolant circulation system for cooling the engine, and uses heat absorbed by the coolant from the engine for indoor heating. However, since a large amount of heat such as that generated by the engine is not generated in the driving source of the electric vehicles, the hybrid cars, and the fuel cell vehicles, such a conventional heating system was limited in using in the electric vehicles, the hybrid cars, and the fuel cell vehicles.

Accordingly, various researches have been made, such as adding a heat pump to an air conditioning system of the electric vehicle, the hybrid car, and the fuel cell vehicle so as to use it as a heat source, or including a separate heat source such as an electric heater. Among those, since the electric heater may more easily heat the coolant without greatly affecting the air conditioning system, it is now widely used.

Here, examples of the electric heater include an air heating heater for directly heating air blown into an indoor of the vehicle, and a coolant heating heater (or a coolant neater) for heating the coolant.

Figure 1:
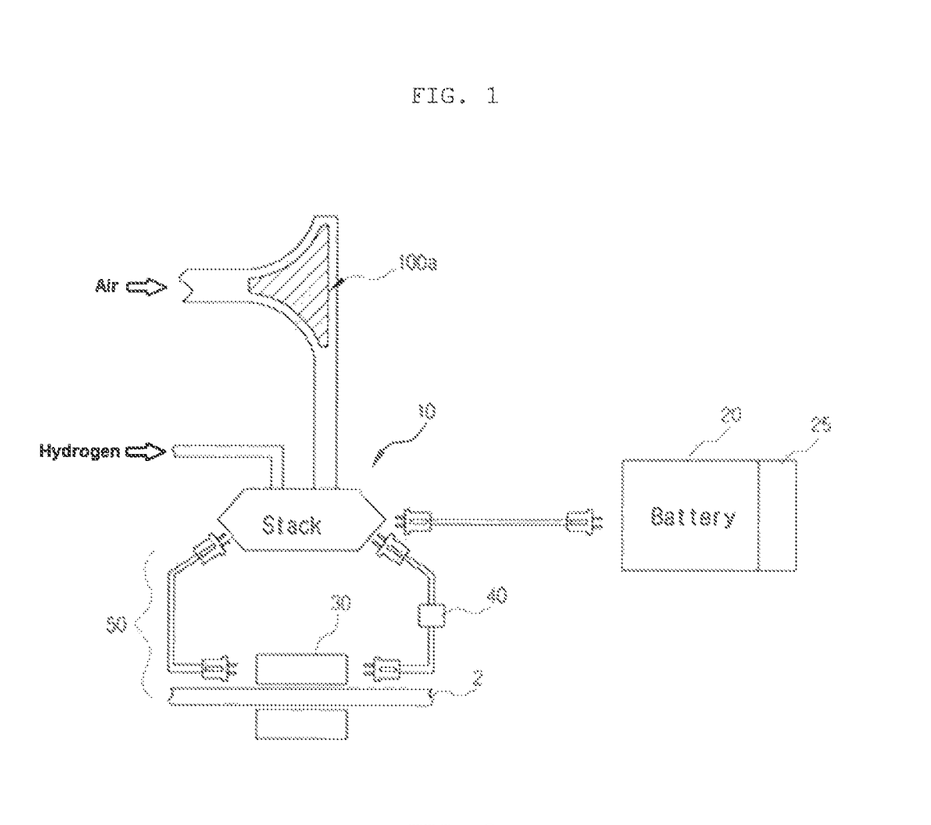
FIGS. 1 and 2 are a schematic view and a cross-sectional view illustrating the conventional coolant heater.
Figure 2:
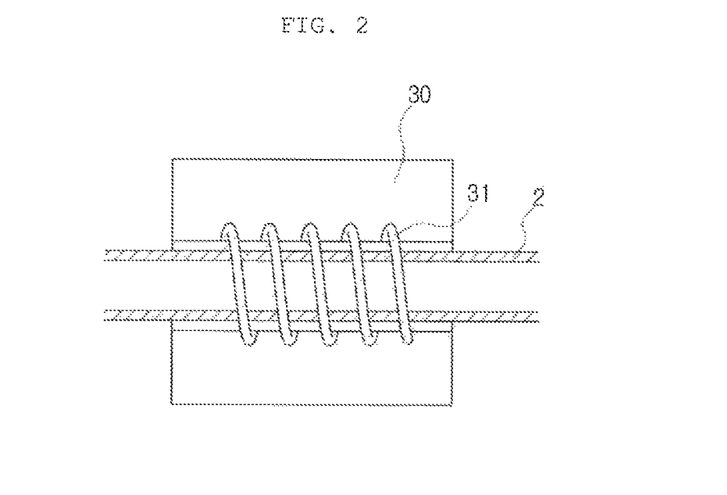

Among those, a conventional induction type of coolant heater which is used in the fuel cell vehicle to heat the coolant is configured so that a high frequency generator 30 is electrically connected to a fuel cell stack 10 that generates power, the high frequency generator 30 is formed in a form of a coil wound around an outer surface of a coolant flow pipe 2 formed of a metal material, which is a magnetic substance, an eddy current is generated in the coolant flow pipe 2 by a magnetic field which is changed when an alternating current flows in an induction coil 31 using the power of the fuel cell stack 10, the coolant flow pipe 2 may be heated by Joule's heat, and the coolant passing through the coolant flow pipe 2 may be heated accordingly, as illustrated in FIGS. 1 and 2.

However, in the conventional induction type of coolant heater, bubbles are generated while the coolant flowing into an inlet of the coolant heater is in contact with a heating element, and accordingly, as the bubbles float up, a flow of the inflow coolant is blocked, thereby increasing flow resistance of the coolant and decreasing heat exchange efficiency. In addition, since it is difficult to cool a controller for controlling the coolant heater, there is a disadvantage in that the controller is not efficiently cooled. Further, since the separate water pump for circulating the coolant is required, there are disadvantages in that a coolant line and an assembly structure are increased, and the structure becomes complicated.

RELATED ART DOCUMENT

Patent Document

Korean Patent Laid-Open Publication No. 2011-0075118 (published on Jul. 6, 2011, entitled "THE EXHAUSTION APPARATUS OF SURPLUS ELECTRIC ENERGY FOR VEHICLE"

SUMMARY

An embodiment of the present invention is directed to providing a coolant heater, and more particularly, a coolant heater capable of minimizing a mounting space and weight by integrating the coolant heater and a water pump with each other and improving a cooling effect of the coolant heater and a controller for controlling a coolant transporter.

In one general aspect, a coolant heater includes: a heater case 100 including a first heater case 110 including a second space portion 142 in which some region of one side thereof is inwardly depressed in a length direction of the heater case 100, and a second heater case 120 which is coupled to the first heater case 110 in a width direction thereof, and having a first space portion 141 formed in the heater case 100 by the coupling between the first heater case 110 and the second heater case 120; a heating means 200 insertedly coupled to the second space portion 142 in which an outer surface of one side thereof is opened in the width direction in a horizontal direction; a heater cover 300 coupled to an outer surface of the second space portion 142 so that the heating means 200 is accommodated in the second space portion 142; a coolant transporter 400 coupled and fixed into the first space portion 141 positioned at a region which is adjacent to the second space portion 142 in the length direction in an inner side of the first heater case 110 and transporting the coolant by pressure; a coolant transporter controller 510 disposed on a surface of the coolant transporter 400 of a side on which the second heater case 120 is positioned, and controlling the coolant transporter 400; and a heater controller 520 disposed on an inner side surface forming the second space portion 142 of the first heater case 110 and controlling the heating means 200, in the first space portion 141.

In the coolant heater 1, an inlet pipe 151 into which the coolant flows may be formed at the heater case 100, an outer pipe 152 through which the coolant is discharged may be formed at the heater cover 300, and a communication hole 153 may be formed to penetrate through a certain region of the surface forming the second space portion 142 in the first heater case 110.

In the coolant heater 1, the input pipe 151 may be formed in a lower side of a region at which the first space portion 141 of the heater case 100 is positioned, and the outlet pipe 152 may be formed in an upper side region of the heater cover 300.

In the coolant heater 1, the coolant may flow into the first space portion 141 through the inlet pipe 151, pass through the communication hole 153 at constant flow velocity by an operation of the coolant transporter 400 to be moved to the second space portion 142, and pass through the heating means 200 from a lower side direction to an upper side direction and be then discharged to the outlet pipe 152.

The heating means 200 may include a first header 210 and a second header 220 which are coupled to an upper surface and a lower surface in a height direction.

In the coolant heater 1, a header insertion groove 160 may be formed in an inner circumference surface of the second space portion 142 so that the first header 210 and the second header 220 are insertedly fixed to the second space portion 142 in a horizontal direction.

In the coolant heater 1, the second heater case 120 may be formed of a metal material, and the electric elements 511 and 512 of the coolant transporter controller 510 may be in surface contact with the second heater case.

The second heater case 120 may correspond to the electric elements 511 and 512 of the coolant transporter controller 510 protruding in the width direction.

In the coolant heater an insulating material which transfers heat and is insulated may be applied onto the surface that the coolant transporter controller 510 and the second heater case 120 are in surface contact with each other.

The first heater case 110 may include a coolant flowing portion 111 formed by externally protruding a region of the first space portion 141 to which the coolant transporter 400 is fixed.

The coolant heater 1 may include a flange portion 410 protruding from an outer circumference surface of an end portion of the first heater case 110 side of the coolant transporter 400, and a coolant transporter cover 420 which is inserted into the outer circumference surface of the coolant transporter 400 and is coupled to the flange portion 410, and the coolant transporter cover 420 and the flange portion 410 may be fixed to an inner side edge surface of the coolant flowing portion 111.

The coolant heater 1 may further include a sealing member 600 between the flange portion 410 and the inner side edge surface of the coolant flowing portion 111.

In the coolant heater 1, the first heater case 110 may be formed of a metal material, and an electric element 521 of the heater controller 520 may be in surface contact with an inner side surface forming the second space portion 142 in the first heater case 110.

DETAILED DESCRIPTION OF MAIN ELEMENTS

1: coolant heater
100: heater case
110: first heater case
111: coolant flowing portion
120: second heater case
141: first space portion
142: second space portion
151: inlet pipe
152: outlet pipe
153: communication hole
160: header insertion groove
200: heating means
210: first header
220: second header
300: heater cover
400: coolant transporter
410: flange portion
420: coolant transporter cover
510: coolant transporter controller
520: heater controller
511, 512, 521: electric element
600: sealing member

DETAILED DESCRIPTION OF EMBODIMENTS

Hereinafter, a coolant heater according to an exemplary embodiment of the present invention as described above will be described in detail with reference to the accompanying drawings.

The present invention relates to a coolant heater 1 capable of minimizing a mounting space and weight by Integrating the coolant heater 1 and a water pump with each other and improving a cooling effect of the coolant heater 1 and a controller for controlling a coolant transporter 400.

Figure 3:
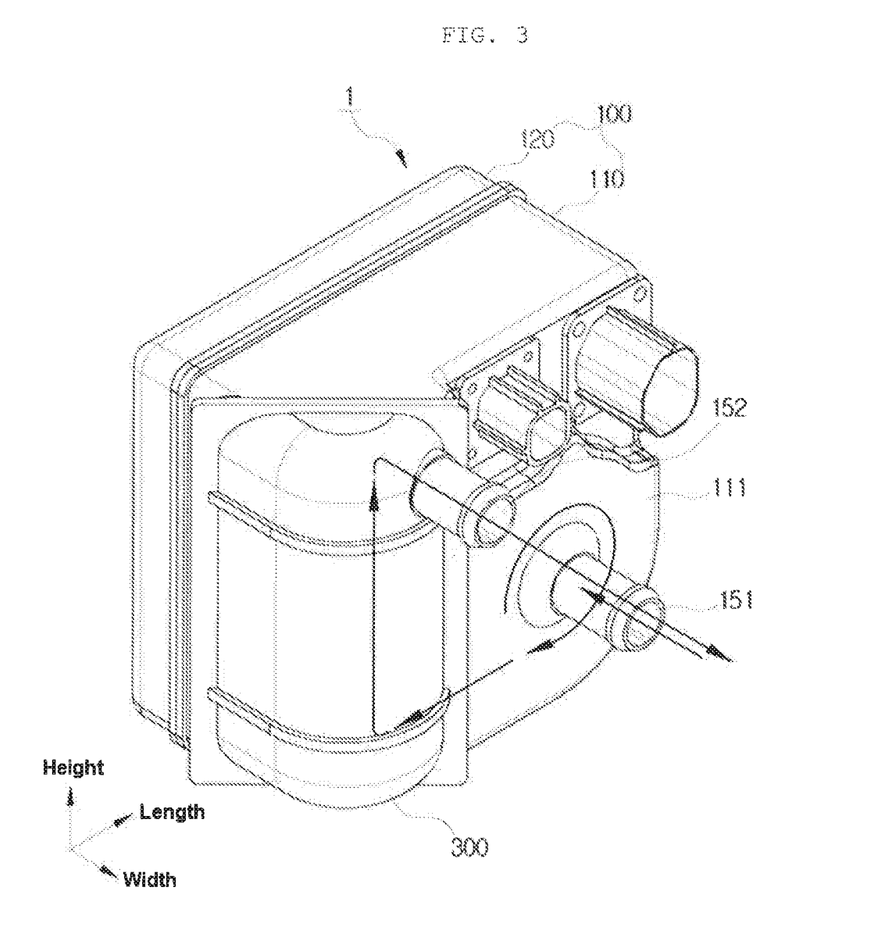
FIG. 3 is a perspective view illustrating a coolant heater according to an exemplary embodiment of the present invention.
Figure 4:
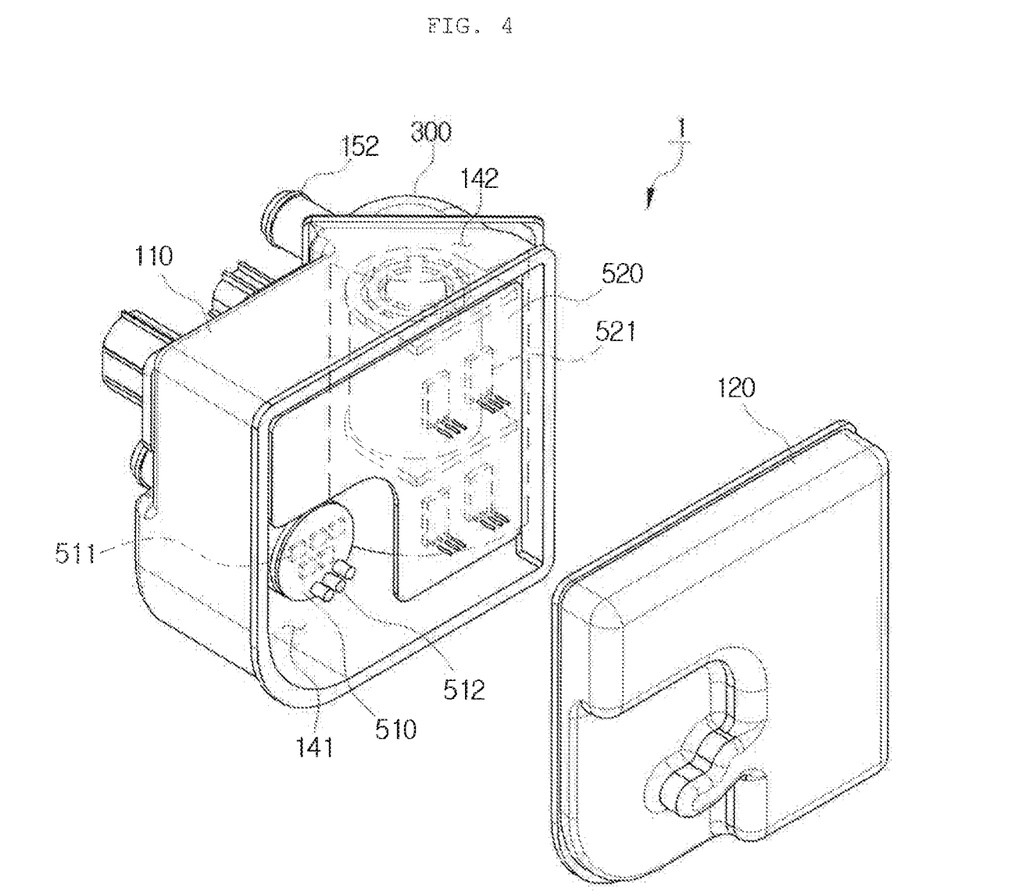
FIGS. 4 and 5 are exploded perspective views illustrating the coolant heater according to an exemplary embodiment of the present invention.
Figure 5:
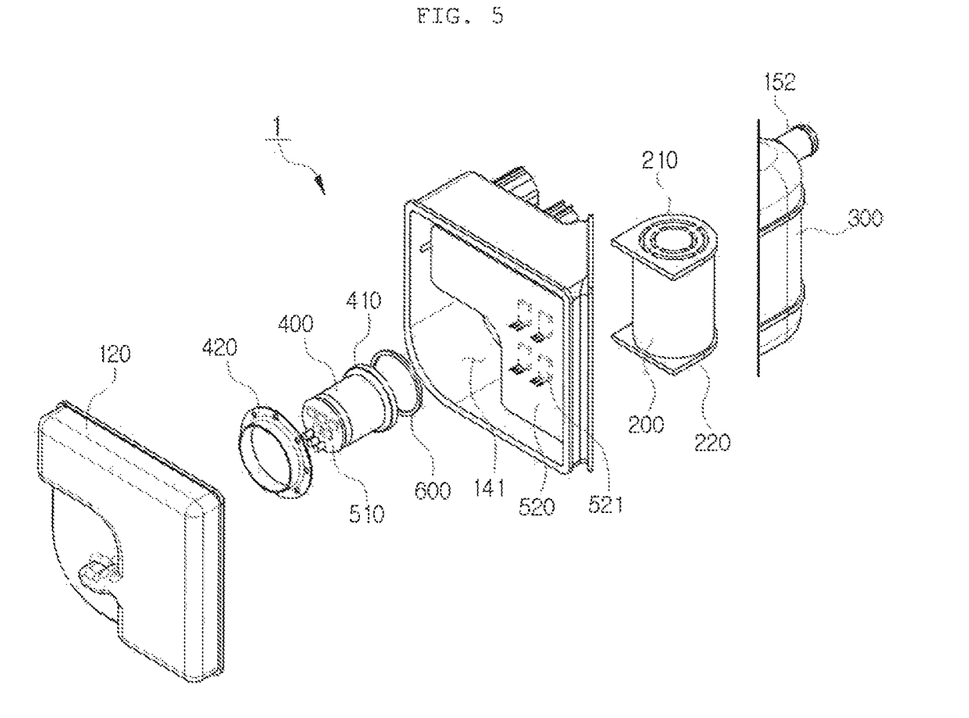

FIGS. 3 to 5 illustrate a perspective view and an exploded perspective view of the coolant heater 1 according to an exemplary embodiment of the present invention.

As illustrated in FIGS. 3 to 5, the coolant heater 1 according to an exemplary embodiment of the present invention generally includes a heater case 100, a heating means 200, a heater cover 300, a coolant transporter 400, a coolant transporter controller 510, and a heater controller 520.

First, the heater case 100 includes a first heater case 110 including a second space portion 142 in which some region of one side thereof is inwardly depressed in a length direction of the heater case 100, and a second heater case 120 which is coupled to the first heater case 110 in a width direction thereof, and has a first space portion 141 formed in the heater case 100 by the coupling between the first heater case 110 and the second heater case 120.

The first space portion 141 is a space in which the coolant transporter 400 is accommodated, and the second space portion 142 is a space in which the heating means 200 is accommodated and is formed in a state in which an outer surface thereof is opened.

That is, the heating means 200 is insertedly coupled to the second space portion 142 in which an outer surface of one side thereof is opened in a horizontal direction.

The heating means 200 may exemplarily include an induction coil 201, and a heating element 202 which is inductively heated by the induction coil 201.

Here, the heating element 202, which is a portion which is inductively heated by the induction coil 201, is formed of a cylindrical metal or a magnetic substance and is heated by an eddy current generated when an alternating current flows therein.

The induction coil 201 may be formed in a form of a coil spring which is wound on an outer circumference surface of the heating element 202 in a circumferential direction a plurality of times and is closely in contact with the outer circumference surface of the heating element 202, and extended lines extended from the wound portion of the coil are electrically connected to a heater controller 520 to be described below.

In this case, the heating element may also be provided to an upper or lower side of the induction coil and is not limited to the above-mentioned form, but may be variously modified.

Further, the heating means 200 includes a first header 210 and a second header 220 which are coupled to an upper surface and a lower surface in a height direction.

That is, the first header 210 and the second header 220 are coupled and fixed to the induction coil and both ends of the heating element, and a header insertion groove 160 may be formed in an inner circumference surface of the second space portion 142 so that the first header 210 and the second header 220 are insertedly fixed to the second space portion 142 in a horizontal direction.

Therefore, the heating means 200 is coupled to the second space portion 142 by inserting the first header 210 and the second header 220 formed at both ends in the height direction into the header insertion groove 160 and then pushing the first header 210 and the second header 220 in a horizontal direction.

The first header 210 and the second header 220 are coupled and fixed to both ends of the heating means 200, and may be formed so that the remaining regions except for the regions coupled to the induction coil and the heating element are opened so as not to interrupt a flow of the coolant flowing into the heating means 200.

Next, a heater cover 300 is coupled to the second space portion 142. The heater cover 300, which is a cover covering the second space portion 142 after the heating means 200 is accommodated in the second space portion 142, is coupled to an outer surface of the second space portion 142.

The coolant transporter 400, which is disposed on a flow path into which the coolant flows and serves to transport the coolant by pressure, and is coupled and fixed to a predetermined position of the first space portion 141.

As an example, the coolant transporter 400 may be a water pump.

The coolant transporter controller 510 is disposed on a surface of the coolant transporter 400 of a side on which the second heater case 120 is positioned, and controls an operation of the coolant transporter 400. The coolant transporter controller 510 may include electric elements such as a plurality of switching elements 511 and capacitors 512, and the switching elements 511 and the capacitors 512 need to be cooled since heat is generated during operation of the coolant transporter 400.

Therefore, in the coolant heater 1 according to an exemplary embodiment of the present invention, the second heater case 120 is formed of the metal material, and the electric elements 511 and 512 of the coolant transporter controller 510 are in surface contact with the second heater case 120, such that the second heater case 120 serves as the heat sink and the coolant transporter controller 510 may be cooled without adding a separate configuration.

In this case, the second heater case 120 may externally protrude to correspond to an element of the coolant transporter controller 510 protruding in a width direction, that is, the switching element or the capacitor.

Further, a plurality of ribs are further formed on the surface of the second heater case 120 which is in surface contact with the coolant transporter controller 510, thereby making it possible to improve heating performance.

Further, in the coolant heater 1, an insulating material capable of transferring heat well and capable of hot rolling is applied onto the surface that the coolant transporter controller 510 and the second heater case 120 are in surface contact with each other. The insulating material may also be thermal grease or a thermal pad, and may be modified to other materials.

Figure 6:
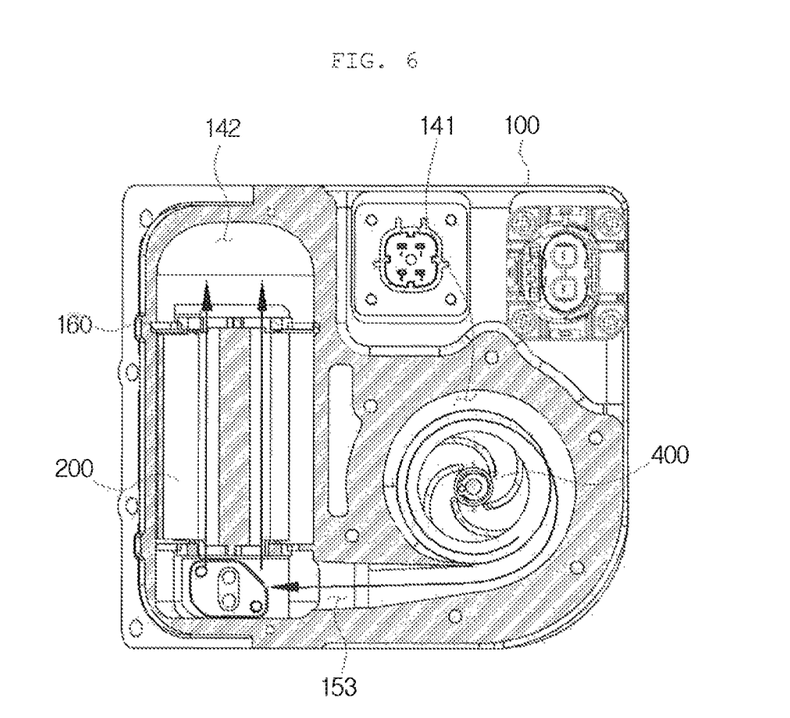
FIG. 6 is a front cross-sectional view illustrating the coolant heater according to an exemplary embodiment of the present invention.
Figure 7:
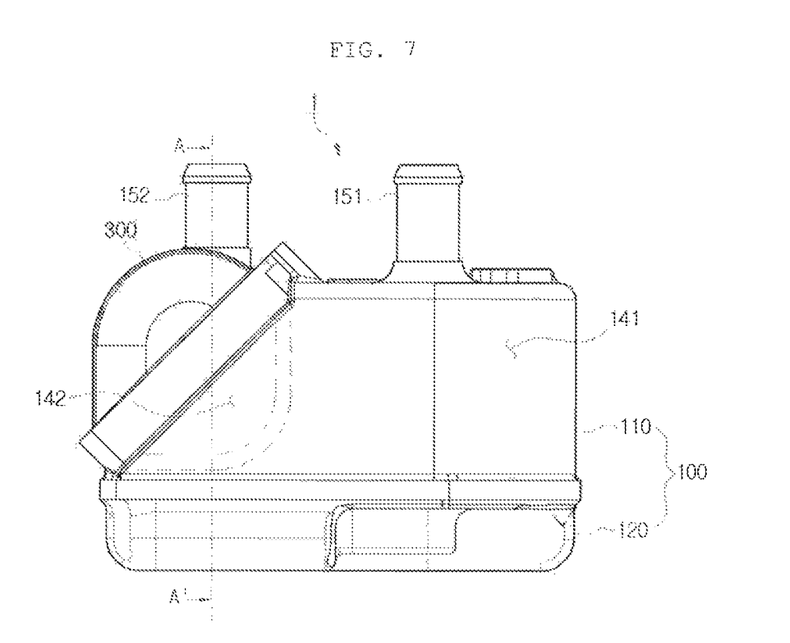
FIG. 7 is a plan view illustrating the coolant heater according to an exemplary embodiment of the present invention.
Figure 8:
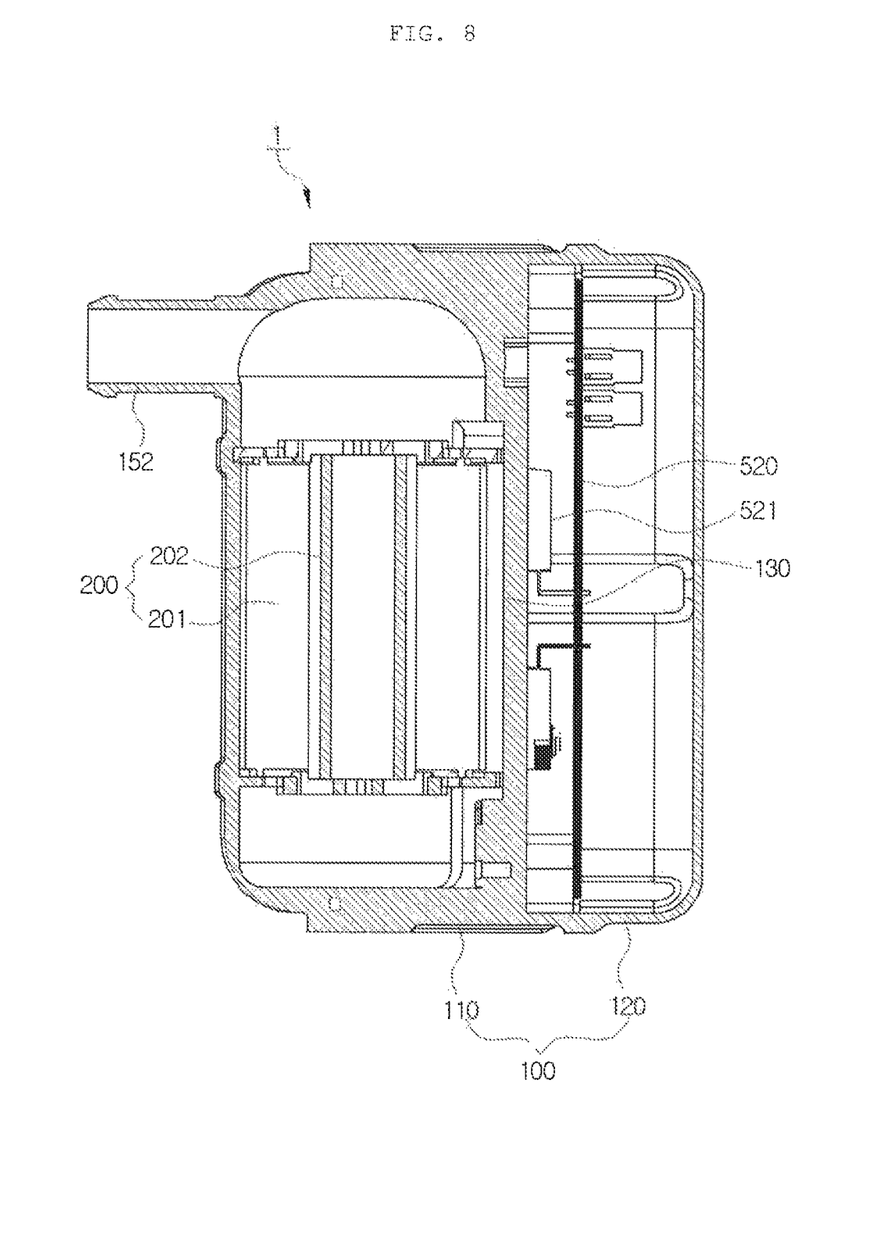
FIG. 8 is a cross-sectional view taken along a direction AA' of FIG. 7.

Meanwhile, as illustrated in FIGS. 6 and 7, in the coolant heater 1, an inlet pipe 151 into which the coolant flows may be formed at the heater case 100, an outer pipe 152 through which the coolant is discharged may be formed at the heater cover 300, and a communication hole 153 may be formed to penetrate through a certain region of the surface forming the second space portion 142 in the first heater case 110.

Here, in the coolant heater 1, the input pipe 151 may be formed in a lower side of a region at which the first space portion 141 of the heater case 100 is positioned, and the outlet pipe 152 may be formed in an upper side region of the heater cover 300.

Here, the coolant flowing in an upper direction while being heat-exchanged with the heating element generates a large amount of bubbles at an upper portion of the heating means 200 because the temperature is the highest at a front end of the outlet pipe 152, which is an upper side of the heating means 200. Therefore, according to the present invention, as though the bubbles are generated, since the bubbles may be smoothly discharged through the outlet pipe 152 and the flow direction of the coolant and the discharge direction of the bubbles flow in the same upper direction in the vicinity of the heating element, thereby making it possible to prevent backflow of the bubbles, reduce flow resistance of the coolant, and improve heat exchange efficiency.

Therefore, the coolant heater 1 is configured so that the coolant flowing into the coolant heater 1 through the inlet pipe 151 formed in the lower side of the first space portion 141 of the first heater case 110 is rotated in the first space portion 141 by the coolant transporter 400, passes through the communication hole 153 while having constant flow velocity, flows into the second space portion 142, is in contact with the heating element of the heating means 200, upwardly flows, and is then discharged through the outlet pipe 152 formed in the upper side of the heater cover 300.

Further, in the coolant heater 1, the coolant flowing into the second space portion 142 penetrates through the heating means 200 and flows from a lower direction to an upper direction, and a clearance space through the coolant may flow from the lower direction to the upper direction may also be formed in an outer region of the heating means 200.

This is to perform the cooling through thermal conduction with the coolant flowing in the second space portion 142, when the first heater case 110 is formed of the metal material, and the electric element of the heater controller 520 is in surface contact with an inner side surface forming the second space portion 142 in the first heater case 110.

The heater controller 520 is disposed on the inner side surface forming the second space portion 142 of the first heater case 110 and controls the heating means 200, in the first space portion 141, and includes electric elements 521, which are the plurality of switching elements, where since a heating temperature of the switching element is about 125° C., which is higher than 90° C., which is the maximum temperature of the coolant, it is possible to cool the switching element through a heat exchange with the coolant.

Therefore, the coolant heater 1 according to an exemplary embodiment of the present invention may effectively cool the coolant transporter controller 510 for controlling the coolant transporter 400 as well as the heater controller 520 without adding a separate heat exchanger.

Meanwhile, as illustrated in FIG. 3, the first heater case 110 includes a coolant flowing portion 111 formed by externally protruding a region of the first space portion 141 to which the coolant transporter 400 is fixed.

The coolant flowing portion 111 is a space in which the coolant sucked into the first space portion 141 through the inlet pipe 151 flows, and is also a region at which the communication hole 153 is positioned.

As illustrated in FIG. 5, the coolant heater 1 further includes a flange portion 410 protruding from an outer circumference surface of an end portion of the first heater case 110 side of the coolant transporter 400, and a coolant transporter cover 420 which is inserted into the outer circumference surface of the coolant transporter 400 and is coupled to the flange portion 410, where the coolant transporter cover 420 and the flange portion 410 are fixed to an inner side of the first heater case 110 of the region in which the coolant flowing portion 111 is formed.

In this case, the coolant heater 1 may further include a sealing member 600 between the flange portion 410 and the inner side surface of the coolant flowing portion 111.

In more detail, the coolant transporter cover 420 fixes the flange portion 410 formed on the coolant transporter 400 to the inner side of the coolant flowing portion 111 of the first heater case 110 to fix the position of the coolant transporter 400 and to compress the sealing member 600 provided between the flange portion 410 and the coolant flowing portion 111, and separates the rear space of the transporter 400 and a space of the coolant flowing portion 111 from each other.

Accordingly, the coolant flowing in the coolant flowing portion 111 has a path in which the coolant flowing in the coolant flowing portion 111 does not flow into the rear of the coolant transporter 400 and is all discharged through the outlet pipe 152 via the second space portion 142.

An operation of the coolant heater 1 according to an exemplary embodiment of the present invention will be generally described.

First, the coolant transported by pressure through the inlet pipe 151 passes through the communication hole 153 through the coolant flowing portion 111 of the first space portion 141 and flows into the second space portion 142.

Next, the coolant is heated through the heat exchange with the heating element in an operation of flowing in the upper direction in the heating means 200 of the second space portion 142, cools the switching elements of the heater controller 520 which are in surface contact with an outer wall of the second space portion 142, and is finally discharged through the outlet pipe 152.

During this operation, the electric element of the coolant transporter controller 510, that is, the switching element or the capacitor is cooled through the surface contact with the second heater case 120.

Accordingly, in the coolant heater 1 according to the exemplary embodiment of the present invention, since the water pump for circulating the coolant is integrated with the coolant heater 1, it is possible to minimize a mounting space and weight including the water pump and the coolant heater 1, and since the water pump case and the bracket are integrated with the housing of the heater, it is possible to reduce the manufacturing cost.

Further, the coolant heater 1 according to an exemplary embodiment of the present invention may effectively cool the coolant transporter controller 510 for controlling the coolant transporter 400 as well as the heater controller 520 for controlling the heating means 200.

In the coolant heater according to the exemplary embodiment of the present invention, since the water pump for circulating the coolant is integrated with the coolant heater, it is possible to minimize the mounting space and weight including the water pump and the coolant heater, and since the water pump case and the bracket are integrated with the housing of the heater, it is possible to reduce the manufacturing cost.

Further, the coolant heater according to the exemplary embodiment of the present invention may effectively cool the coolant transporter controller for controlling the coolant transporter as well as the heater controller for controlling the heating means.

In more detail, according to the present invention, the second heater case on the side on which the coolant transporter controller is positioned is made of the conductive material to serve as the heat sink, thereby cooling the coolant transporter controller without adding a separate configuration, and the electric element of the heater controller is in surface contact with the first heater case made of the conductive material, thereby cooling the heater controller through thermal conduction with the coolant flowing in the second space portion.

Further, according to the present invention, since the coolant flowing into the heater case which is adjacent to the coolant transporter is sucked by the impeller of the coolant transporter, immediately flows into the second space portion without pressure drop, passes through the heating means, and is then discharged, it is possible to supply the coolant at high flow velocity and the heat exchange with the heating means is advantageous.

Further, according to the present invention, since the coolant flows into a lower side of the heating means, upwardly flows, and is then discharged, it is possible to prevent the backflow of the bubbles, reduce the flow resistance of the coolant, and improve the cooling efficiency.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A coolant heater comprising:
    a heater case including a first heater case including a second space portion, and a second heater case which is coupled to the first heater case, and having a first space portion formed in the heater case by the coupling between the first heater case and the second heater case;

a heating means insertedly coupled to the second space portion;

a heater cover coupled to an outer surface of the second space portion so that the heating means is accommodated in the second space portion;

a coolant transporter coupled and fixed into the first space portion positioned at a region which is adjacent to the second space portion in an inner side of the first heater case and transporting the coolant by pressure;

a coolant transporter controller disposed on a surface of the coolant transporter of a side on which the second heater case is positioned, and controlling the coolant transporter; and a heater controller disposed on an inner side surface forming the second space portion of the first heater case and controlling the heating means, in the first space portion.

2. The coolant heater of claim 1, wherein in the coolant heater, an inlet pipe into which the coolant flows is formed at the first heater case, an outer pipe through which the coolant is discharged is formed at the heater cover, and a communication hole is formed to penetrate through a certain region of the surface forming the second space portion in the first heater case.

3. The coolant heater of claim 2, wherein in the coolant heater, the input pipe is formed in a lower side of a region at which the first space portion of the heater case is positioned, and the outlet pipe is formed in an upper side region of the heater cover.

4. The coolant heater of claim 3, wherein in the coolant heater, the coolant flows into the first space portion through the inlet pipe, passes through the communication hole at constant flow velocity by an operation of the coolant transporter to be moved to the second space portion, and passes through the heating means from a lower side direction to an upper side direction and is then discharged to the outlet pipe.

5. The coolant heater of claim 1, wherein the heating means includes a first header and a second header which are coupled to an upper surface and a lower surface in a height direction.

6. The coolant heater of claim 5, wherein in the coolant heater, a header insertion groove is formed in an inner circumference surface of the second space portion so that the first header and the second header are insertedly fixed to the second space portion in a horizontal direction.

7. The coolant heater of claim 1, wherein in the coolant heater, the second heater case is formed of a metal material, and electric elements of the coolant transporter controller are in surface contact with the second heater case.

8. The coolant heater of claim 7, wherein the second heater case corresponds to the electric elements of the coolant transporter controller protruding in the width direction.

9. The coolant heater of claim 8, wherein in the coolant heater, an insulating material which transfers heat and is insulated is applied onto the surface that the coolant transporter controller and the second heater case are in surface contact with each other.

10. The coolant heater of claim 1, wherein the first heater case includes a coolant flowing portion formed by externally protruding a region of the first space portion to which the coolant transporter is fixed.

11. The coolant heater of claim 10, wherein the coolant heater includes a flange portion protruding from an outer circumference surface of an end portion of the first heater case side of the coolant transporter, and a coolant transporter cover which is inserted into the outer circumference surface of the coolant transporter and is coupled to the flange portion, and the coolant transporter cover and the flange portion are fixed to an inner side edge surface of the coolant flowing portion.

12. The coolant heater of claim 11, wherein the coolant heater further includes a sealing member between the flange portion and the inner side edge surface of the coolant flowing portion.

13. The coolant heater of claim 1, wherein in the coolant heater, the first heater case is formed of a metal material, and an electric element of the heater controller is in surface contact with an inner side surface forming the second space portion in the first heater case.

* * * * *